United States Patent
Kaskari et al.

(10) Patent No.: US 10,504,539 B2
(45) Date of Patent: Dec. 10, 2019

(54) VOICE ACTIVITY DETECTION SYSTEMS AND METHODS

(71) Applicant: SYNAPTICS INCORPORATED, San Jose, CA (US)

(72) Inventors: Saeed Mosayyebpour Kaskari, Irvine, CA (US); Francesco Nesta, Aliso Viejo, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/832,709

(22) Filed: Dec. 5, 2017

(65) Prior Publication Data

US 2019/0172480 A1 Jun. 6, 2019

(51) Int. Cl.
| | | |
|---|---|---|
| G10L 25/78 | (2013.01) | |
| G10L 15/02 | (2006.01) | |
| G10L 15/22 | (2006.01) | |
| G10L 15/16 | (2006.01) | |
| G10L 25/30 | (2013.01) | |
| G10L 25/18 | (2013.01) | |
| G10L 25/21 | (2013.01) | |

(52) U.S. Cl.
CPC .............. G10L 25/78 (2013.01); G10L 15/02 (2013.01); G10L 15/16 (2013.01); G10L 15/22 (2013.01); G10L 25/30 (2013.01); *G10L 25/18* (2013.01); *G10L 25/21* (2013.01)

(58) Field of Classification Search
CPC ...................................................... G10L 25/78
See application file for complete search history.

(56) References Cited

U.S. PATENT DOCUMENTS

| | | | | |
|---|---|---|---|---|
| 6,370,500 | B1 * | 4/2002 | Huang .................. | G10L 19/012 |
| | | | | 704/207 |
| 2003/0231775 | A1 * | 12/2003 | Wark ..................... | G10L 15/02 |
| | | | | 381/56 |
| 2005/0049865 | A1 * | 3/2005 | Yaxin .................... | G10L 15/26 |
| | | | | 704/239 |

(Continued)

OTHER PUBLICATIONS

Dov, David, et al., "Audio-Visual Voice Activity Detection Using Diffusion Maps," IEEE/ACM Transactions on Audio, Speech, and Language Processing, Apr. 2015, pp. 732-745, vol. 23, Issue 4, IEEE, New Jersey, U.S.A.

(Continued)

*Primary Examiner* — Douglas Godbold
(74) *Attorney, Agent, or Firm* — Haynes and Boone, LLP (57) ABSTRACT

An audio processing device or method includes an audio transducer operable to receive audio input and generate an audio signal based on the audio input. The audio processing device or method also includes an audio signal processor operable to extract local features from the audio signal, such as Power-Normalized Coefficients (PNCC) of the audio signal. The audio signal processor also is operable to extract global features from the audio signal, such as chroma features and harmonicity features. A neural network is provided to determine a probability that a target audio is present in the audio signal based on the local and global features. In particular, the neural network is trained to output a value indicating whether the target audio is present and locally dominant in the audio signal.

14 Claims, 9 Drawing Sheets

(56) References Cited

U.S. PATENT DOCUMENTS

| | | | |
|---|---|---|---|
| 2007/0021958 A1* | 1/2007 | Visser | G10L 21/0272 704/226 |
| 2008/0082328 A1* | 4/2008 | Lee | G10L 25/78 704/234 |
| 2008/0147414 A1* | 6/2008 | Son | G10L 19/20 704/500 |
| 2010/0017202 A1* | 1/2010 | Sung | G10L 19/20 704/208 |
| 2013/0046536 A1* | 2/2013 | Lu | G10L 25/78 704/233 |
| 2014/0180674 A1 | 6/2014 | Neuhauser et al. | |
| 2014/0180675 A1* | 6/2014 | Neuhauser | G06F 17/28 704/9 |
| 2014/0330556 A1* | 11/2014 | Resch | G10H 1/0008 704/221 |
| 2014/0358265 A1 | 12/2014 | Wang et al. | |
| 2015/0032446 A1* | 1/2015 | Dickins | G10L 25/78 704/233 |
| 2015/0094835 A1 | 4/2015 | Eronen et al. | |
| 2016/0078879 A1* | 3/2016 | Lu | G10L 25/81 381/56 |
| 2016/0093290 A1* | 3/2016 | Lainez | G06F 16/353 704/232 |
| 2016/0093313 A1* | 3/2016 | Vickers | G10L 25/78 704/232 |
| 2017/0092297 A1* | 3/2017 | Sainath | G10L 25/78 |
| 2017/0105080 A1* | 4/2017 | Das | H04R 29/00 |
| 2017/0287489 A1* | 10/2017 | Biswal | G10L 17/06 |
| 2018/0025730 A1* | 1/2018 | Giletti | G10L 15/142 704/246 |
| 2018/0158463 A1* | 6/2018 | Ge | G10L 17/04 |
| 2018/0166067 A1* | 6/2018 | Dimitriadis | G10L 15/04 |

OTHER PUBLICATIONS

Drugman, Thomas, et al., "Voice Activity Detection: Merging Source and Filter-based Information," IEEE Signal Processing Letters, Feb. 2016, pp. 252-256, vol. 23, Issue 2, IEEE.

Ghosh, Prasanta Kumar, et al., "Robust voice activity detection using long-term signal variability," IEEE Transactions on Audio, Speech, and Language Processing, Mar. 2011, 38 Pages, vol. 19, Issue 3, IEEE, New Jersey, U.S.A.

Graf, Simon, et al., "Features for voice activity detection: a comparative analysis," EURASIP Journal on Advances in Signal Processing, Dec. 2015, 15 Pages, vol. 2015, Issue 1, Article No. 91.

Hughes, Thad, et al., "Recurrent Neural Networks for Voice Activity Detection," 2013 IEEE International Conference on Acoustics, Speech and Signal Processing, May 26-31, 2013, pp. 7378-7382, IEEE.

Kang, Tae Gyoon, et al., "DNN-Based Voice Activity Detection with Local Feature Shift Technique," 2016 Asia-Pacific Signal and Information Processing Association Annual Summit and Conference (APSIPA), Dec. 13-16, 2016, 4 Pages, IEEE, Jeju, South Korea.

Kim, Chanwoo, et al., "Power-Normalized Cepstral Coefficients (PNCC) for Robust Speech Recognition," IEEE Transactions on Audio, Speech, and Language Processing, Jul. 2016, pp. 1315-1329, vol. 24, Issue 7, IEEE, New Jersey, U.S.A.

Kinnunen, Tomi, et al., "Voice Activity Detection Using MFCC Features and Support Vector Machine," Int. Conf. on Speech and Computer (SPECOM07), 2007, 4 Pages, vol. 2, Moscow, Russia.

Li, Xiaofei, et al., "Voice Activity Detection Based on Statistical Likelihood Ratio With Adaptive Thresholding," 2016 IEEE International Workshop on Acoustic Signal Enhancement (IWAENC), Sep. 13-16, 2016, pp. 1-5, IEEE, Xi'an, China.

Ma, Yanna, et al., "Efficient voice activity detection algorithm using long-term spectral flatness measure," EURASIP Journal on Audio, Speech, and Music Processing, Dec. 2013, 18 Pages, vol. 2013, Issue 1, Article No. 87, Hindawi Publishing Corp., New York, U.S.A.

Mousazadeh, Saman, et al., "Voice Activity Detection in Presence of Transient Noise Using Spectral Clustering," IEEE Transactions on Audio, Speech, and Language Processing, Jun. 2013, pp. 1261-1271, vol. 21, No. 6, IEEE, New Jersey, U.S.A.

Ryant, Neville, et al., "Speech Activity Detection on YouTube Using Deep Neural Networks," Interspeech, Aug. 25-29, 2013, pp. 728-731, Lyon, France.

Ying, Dongwen, et al., "Voice Activity Detection Based on an Unsupervised Learning Framework," IEEE Transactions on Audio, Speech, and Language Processing, Nov. 2011, pp. 2624-2633, vol. 19, Issue 8, IEEE, New Jersey, U.S.A.

Kim, Jaebok et al., "Deep Temporal Models using Identity Skip-Connections for Speech Emotion Recognition," Oct. 23-27, 2017, 8 pages.

Wang, Longbiao et al., "Phase Aware Deep Neural Network for Noise Robust Voice Activity Detection," IEEE/ACM, Jul. 10-14, 2017, pp. 1087-1092.

Written Opinion and International Search Report for International App. No. PCT/US2018/063937, 11 pages.

* cited by examiner

VOICE ACTIVITY DETECTION SYSTEMS AND METHODS

TECHNICAL FIELD

The present application, in accordance with one or more embodiments, relates generally to systems and methods for audio signal detection and processing and, more particularly, for example, to voice activity detection.

BACKGROUND

Voice Activity Detection (VAD) is used in various speech communication systems, such as speech recognition systems, noise reduction systems, sound source localization systems, and the like. In real environments, the detected speech signal are often received from noisy environments and include various noise signals that degrade the speech intelligibility and/or decrease the VAD performance of associated detection devices, such as phones and laptops. Conventional VAD techniques have various limitations and may require relatively large processing or memory resources that are not practical for real time voice activity detection in low power devices. Thus, there is a continued need in the art for improved VAD solutions.

SUMMARY

The present disclosure provides methods and systems for detecting a target audio source, such as a person's voice speech, from an audio signal. In one or more embodiments, an audio processing device includes an audio sensor and an audio signal processor. The audio sensor is operable to receive audio input and generate a corresponding audio signal. The audio signal processor includes a local feature extraction component operable to extract local features from the audio signal, a global feature extraction component operable to extract global features from the audio signal, and a neural network operable to determine a probability that a target audio signal is present in the input audio signal based on the local and global features.

In one or more embodiments, a method for processing audio signals includes sensing sound be an audio sensor and generating a corresponding audio signal, extracting local features from the audio signal, extracting global features from the audio signal, and determining, by a neural network, a probability that a target audio signal is present in the audio signal based on the local and global features.

The scope of the present disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided herein to facilitate VAD in audio systems and applications. In accordance with various embodiments of the present disclosure, an audio processing device or method may include an audio sensor operable to receive audio from an environment and generate a corresponding audio signal. The audio processing device or method also may include an audio signal processor which includes a local feature extraction component, a global feature extraction component, and a neural network. The local and global feature extraction components are operable respectively to extract local and global features from the audio signal. The neural network is operable to determine a probability that a target audio is present in the audio signal based on the local and global features.

In some embodiments, the local features may correspond to Power-Normalized Coefficients (PNCC) of the audio signal. The global features may include chroma features and harmonicity features. In particular, the harmonicity features may include Harmonic Additive Spectrum (HAS) features and Harmonic Difference Spectrum (HDS) features. In some embodiments, the neural network is trained to output a value indicating whether the target audio is present in the audio signal.

In an embodiment, a VAD method may be implemented based on a feed-forward Neural Network which integrates global and local subband spectral features. In particular, the neural network may be trained with speech features and a definition of a cost function that combines both predefined labels and signal-to-noise ratio based masks. This may prevent the neural network from unnecessarily overfitting in the attempt to discriminate difficult conditions.

In some embodiments, the VAD method may determine a probability of speech activity independent from the speech loudness and relative dominance that does not depend on the previous signal conditions (e.g., memory-less). This may prevent the VAD method from producing a wrong prediction if the speech loudness conditions are time-variant, such as in conditions that may be observed in far-field with different near and far speakers. The VAD method also may discriminate speech from non-stationary noise, including music, residual echoes and impulsive events. In some embodiments, the proposed VAD system or method may achieve an accuracy of over 90% in a variety of non-trivial noisy conditions including nonstationary noises such as transient noise.

In general, there are at least three categories of VAD methods: 1) supervised or semi-supervised training methods; 2) methods based on long-term statistics; and 3) energy-based methods. Supervised or semi-supervised training methods may be based on speech features such as Mel-Frequency Cepstral Coefficients (MFCC) feature. These methods may utilize various classifiers, such as support vector machines, spectral clustering, Gaussian mixture model (GMM) and a neural network. These methods may require supervised or semi-supervised learning using sufficient amount of speech and noise speech dataset.

Methods based on long-term statistics, such as signal variability and spectral flatness, may use the characteristic of long term variability of speech that can differentiate between speech and noise. Except for the setting of thresholds in certain embodiments, these methods are usually unsupervised. Energy-based methods assume that the speech signal is dominant and the speech portions have higher energy than non-speech portions. However, each of these three categories of VAD solutions may have some limitations which make them impractical in certain real-time, low power applications.

For example, supervised or semi-supervised training methods are limited by an understanding of observed events. However, the true manifold of the data sometimes may not be fully captured. Many conventional approaches do not work reasonably well in the unseen noisy test data and the solutions do not generalize due to an overfitting problem. Also, the more robust and effective solutions are based on a complex system architecture of classifiers such as deep neural network or recurrent neural network. These methods, however, are not practical for certain low power applications due to their complexity and memory requirements.

Methods based on long-term statistics do not perform well when the noise is impulsive such as key click noise. The signal variability for both transient noise and speech may be similar leading to impulse noise being classified as speech. Also, this approach may require a proper threshold. However, setting a fixed threshold may not work in real environments characterized by changing environments, including changes of the level of input.

The energy based methods are based on an assumption on the dominancy of speech. This approach assumes that the speech signal is locally dominant and thus has higher energy. However, this assumption may not satisfy in real environment where the speaker-microphone distance may be long causing the level of speech to be lower than the ambient noise. Therefore, the energy based VAD methods may fail to work in many practical environments.

As noted above, conventional VAD methods have various challenges in non-stationary noise environments. For example, the respective computational complexities in conventional VAD methods may cause the algorithms to be impractical for many real-world use cases and eliminate the possibility of real-time, "online" processing. The memory consumptions of many conventional VAD algorithms are relatively high and are not suitable for embedded devices which requires memory efficient algorithm. Further, in a real environment, the noisy speech signals are usually captured with reverberation that can be time-varying due to the changes in the environment. This can greatly deteriorate the performance of conventional VAD methods or systems.

Many of the more robust VAD methods are batch approaches and work in offline settings. However, in certain VAD applications, such as VoIP, it may be desirable to minimize latency. Also, some VAD methods may require a history of past input to determine the probability of speech at the current frame. However, many VAD applications require memory-less solutions. Further, some VAD methods do not generalize well in new unseen data especially when the noise has not been included as part of the training. Conventional VAD methods do not perform well in nonstationary noisy condition including the transient noise and may be sensitive to the level of the input data.

Accordingly, improved VAD systems and methods are proposed to address one or more of the aforementioned limitations and shortcoming of the conventional VAD methods. In particular, the improved VAD systems and methods may require less memory and/or less processing resources. In some embodiments, the improved VAD systems and methods may be memory-less which has almost no latency and is desirable for applications, such as voice of internet protocol (VOIP) or speech enhancements for Automatic Speech Recognition (ASR).

In some embodiments, the improved VAD systems and methods may use a single-channel input signal to extract the input feature for the feedforward network with one hidden layer. The network may output the probability of the speech at each frame. In particular, the input feature may be an integration of Power-Normalized Coefficients (PNCC) feature as a local feature and two proposed global features based on chroma and harmonicity as the global features. The local feature and global features may be concatenated in a short window having the current frame in the center. Then, the noisy speech sequences for training are created similar to the work in T. Drugman, Y. Stylianou, Y. Kida, and M. Akamine, "*Voice activity detection: Merging source and filter-based information*," IEEE Signal Processing Letters, vol. 23, no. 2, pp. 252-256, 2016. In some embodiments, approximately 30% of simulated noisy sequences are convolved with recorded impulse responses in random-manner. The proposed VAD system may be trained using a single-layer feedforward network with a cost function based on the Signal to Noise Ratio (SNR) of the signal using the gammatone filterbank. Test results have shown that the improved VAD systems and methods disclosed herein may achieve an accuracy of over 90% even in unseen test data.

The improved VAD systems and methods may have a plurality of advantages over conventional VAD methods. For example, the improved VAD systems and methods may implement real-time processing with almost no latency, is robust to high noise conditions and impulsive noise, such as key click noises. The improved VAD systems and methods may be more memory and computational efficient and may require low processing load and memory. This is practical for many applications which have certain constrains on the memory usage and processing load.

The improved VAD systems and methods also may be robust to the level of the input speech signal. This is practical for environments where the microphone-speaker distance can change and this will result in changes in the level of the input speech signal. The improved VAD also may be more robust to time-varying environment where both and reverberation and noise may change over time. The improved VAD also is robust to non-stationary noise and performs well to discriminate speech and music in low signal to noise ratio (SNR) and in reverb conditions. In some embodiments, the improved VAD may perform well even with audio signals from only one audio transducer.

Figure 1:
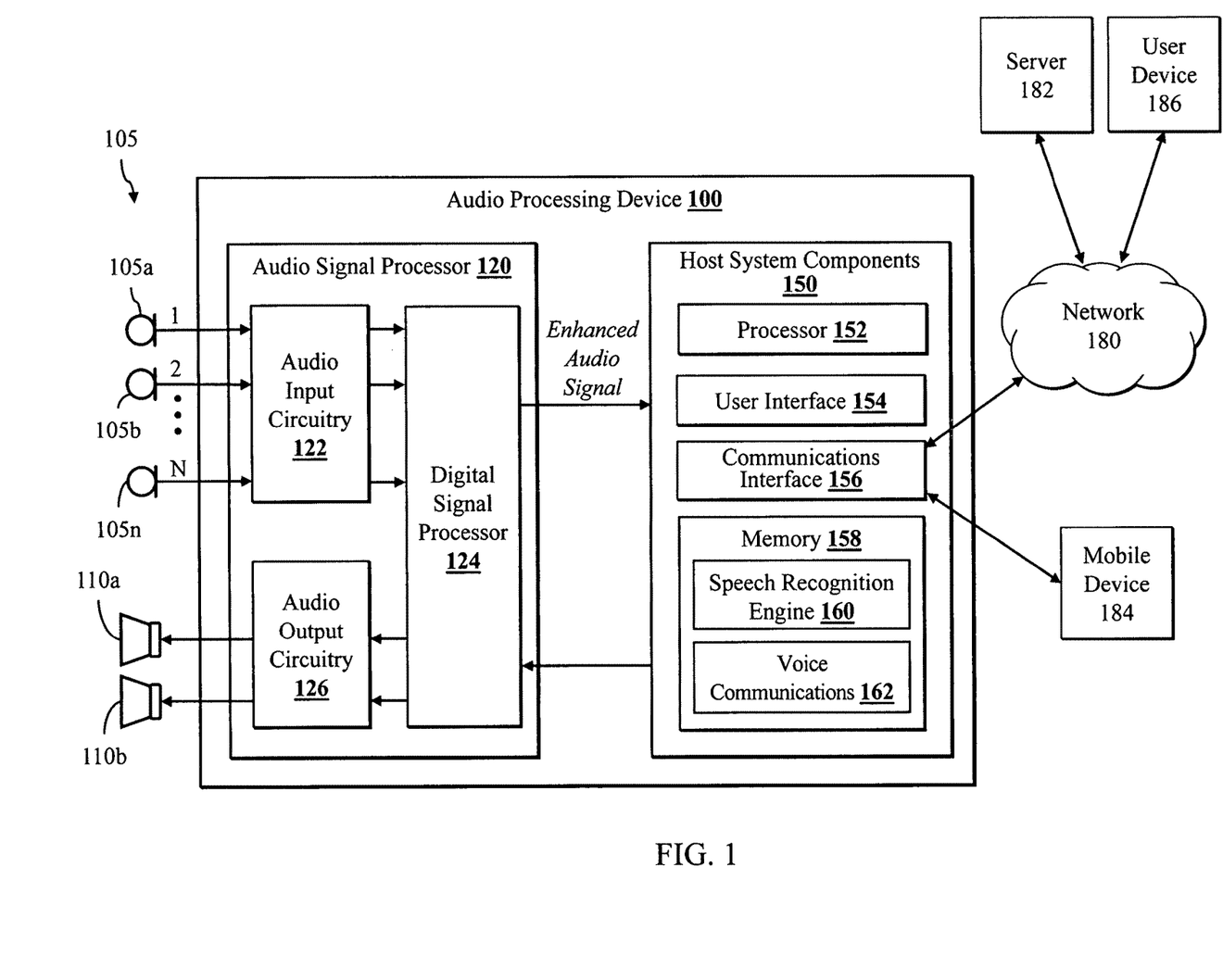
FIG. 1 illustrates a system for facilitating voice activity detection in accordance with one or more embodiments of the present disclosure.

FIG. 1 illustrates an audio processing device 100 according to various embodiments of the disclosure. The audio processing device 100 includes an input for an audio sensor array 105, an audio signal processor 120 and host system components 150.

The audio sensor array 105 comprises one or more sensors, each of which may convert sound waves into an audio signal. In the illustrated environment, the audio sensor array 105 comprises a plurality of microphones 105a-105n, each generating one audio channel of a multi-channel audio signal.

The audio signal processor 120 includes the audio input circuitry 122, a digital signal processor 124 and optional audio output circuitry 126. In various embodiments the audio signal processor 120 may be implemented as an integrated circuit comprising analog circuitry, digital circuitry and the digital signal processor 124, which is operable to execute program instructions stored in firmware. The audio input circuitry 122, for example, may include an interface to the audio sensor array 105, anti-aliasing filters, analog-to-digital converter circuitry, echo cancellation circuitry, and other audio processing circuitry and components as disclosed herein. The digital signal processor 124 is operable to process a multichannel digital audio signal to generate an enhanced audio signal, which is output to one or more host system components 150. In various embodiments, the multichannel audio signal includes a mixture of noise signals and at least one desired target audio signal (e.g., human speech), and the digital signal processor 124 is operable to isolate or enhance the desired target signal, while reducing the undesired noise signals. The digital signal processor 124 may be operable to perform echo cancellation, noise cancellation, target signal enhancement, post-filtering, and other audio signal processing functions.

The digital signal processor 124 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The digital signal processor 124 is operable to interface and communicate with the host system components 150, such as through a bus or other electronic communications interface.

The optional audio output circuitry 126 processes audio signals received from the digital signal processor 124 for output to at least one speaker, such as speakers 110a and 110b. In various embodiments, the audio output circuitry 126 may include a digital-to-analog converter that converts one or more digital audio signals to corresponding analog signals and one or more amplifiers for driving the speakers 110a-110b.

The audio processing device 100 may be implemented as any device operable to receive and detect target audio data, such as, for example, a mobile phone, smart speaker, tablet, laptop computer, desktop computer, voice controlled appliance, or automobile. The host system components 150 may comprise various hardware and software components for operating the audio processing device 100. In the illustrated embodiment, the system components 150 include a processor 152, user interface components 154, a communications interface 156 for communicating with external devices and networks, such as network 180 (e.g., the Internet, the cloud, a local area network, or a cellular network) and mobile device 184, and a memory 158.

The processor 152 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 150 are operable to interface and communicate with the audio signal processor 120 and the other system components 150, such as through a bus or other electronic communications interface.

It will be appreciated that although the audio signal processor 120 and the host system components 150 are shown as incorporating a combination of hardware components, circuitry and software, in some embodiments, at least some or all of the functionalities that the hardware components and circuitries are operable to perform may be implemented as software modules being executed by the processing component 152 and/or digital signal processor 124 in response to software instructions and/or configuration data, stored in the memory 158 or firmware of the digital signal processor 124.

The memory 158 may be implemented as one or more memory devices operable to store data and information, including audio data and program instructions. Memory 158 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 152 may be operable to execute software instructions stored in the memory 158. In various embodiments, a speech recognition engine 160 is operable to process the enhanced audio signal received from the audio signal processor 120, including identifying and executing voice commands. Voice communications components 162 may be operable to facilitate voice communications with one or more external devices such as a mobile device 184 or user device 186, such as through a voice call over a mobile or cellular telephone network or a VoIP call over an IP (internet protocol) network. In various embodiments, voice communications include transmission of the enhanced audio signal to an external communications device.

The user interface components 154 may include a display, a touchpad display, a keypad, one or more buttons and/or other input/output components operable to enable a user to directly interact with the audio processing device 100.

The communications interface 156 facilitates communication between the audio processing device 100 and external devices. For example, the communications interface 156 may enable Wi-Fi (e.g., 802.11) or Bluetooth connections between the audio processing device 100 and one or more local devices, such as mobile device 184, or a wireless router providing network access to a remote server 182, such as through the network 180. In various embodiments, the communications interface 156 may include other wired and wireless communications components facilitating direct or indirect communications between the audio processing device 100 and one or more other devices.

Figure 2:
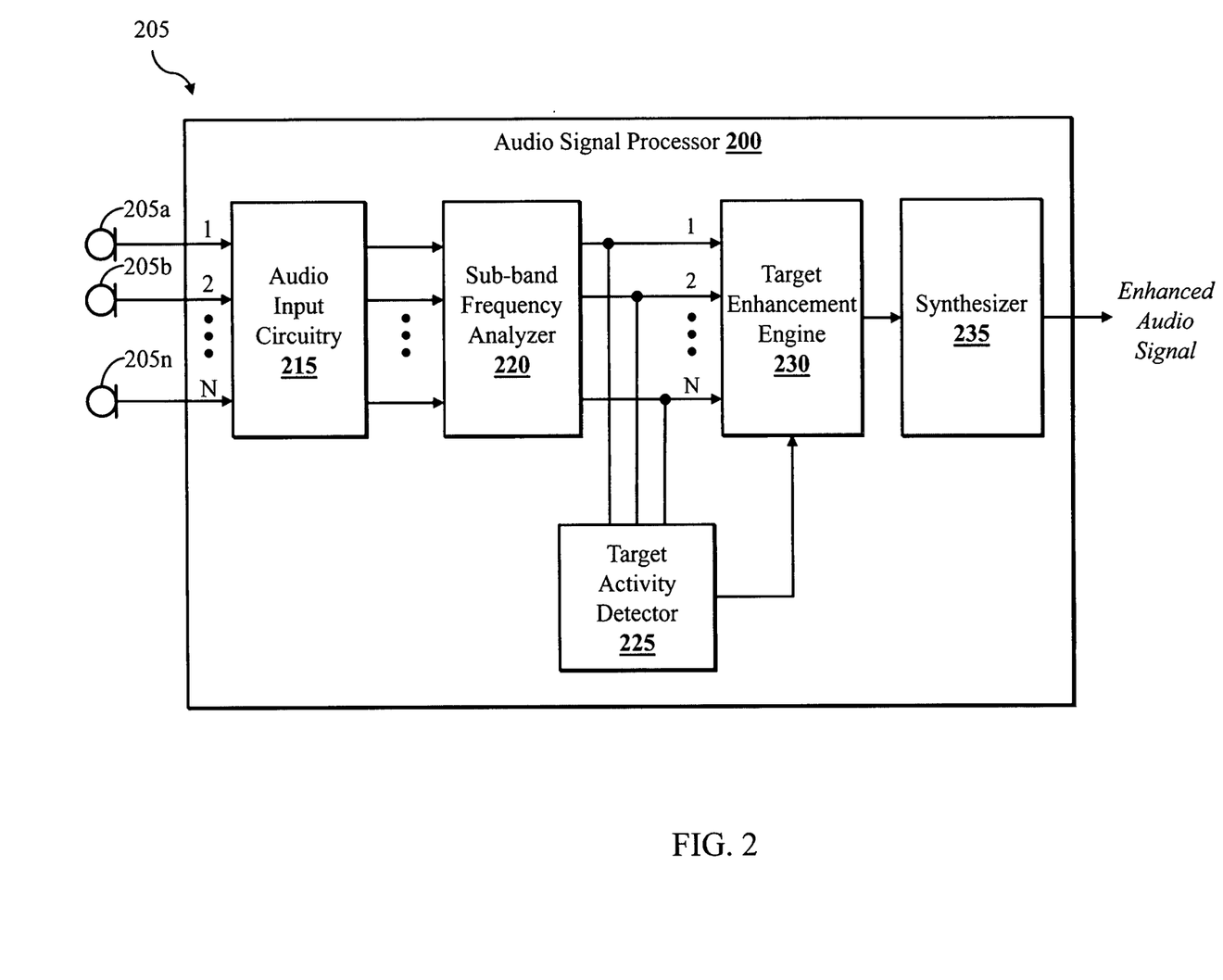
FIG. 2 illustrates a device configured to implement voice activity detection in accordance with one or more embodiments of the present disclosure.

FIG. 2 illustrates an audio signal processor 200 according to various embodiments of the disclosure. In some embodiments, the audio signal processor 200 is embodied as one or more integrated circuits including analog and digital circuitry and firmware logic implemented by a digital signal processor, such as digital signal processor 124 of FIG. 1. As illustrated, the audio signal processor 200 includes audio input circuitry 215, a sub-band frequency analyzer 220, a target activity detector 225, a target enhancement engine 230, and a synthesizer 235.

The audio signal processor 200 receives a multi-channel audio input from a plurality of audio sensors, such as a sensor array 205 comprising at least one audio sensor 205a-n. The audio sensors 205a-205n may include microphones that are integrated with an audio processing device, such as the audio processing device 100 of FIG. 1, or external components connected thereto.

The audio signals may be processed initially by the audio input circuitry 215, which may include anti-aliasing filters, analog to digital converters, and/or other audio input circuitry. In various embodiments, the audio input circuitry 215 outputs a digital, multichannel, time-domain audio signal having N channels, where N is the number of sensor (e.g., microphone) inputs. The multichannel audio signal is input to the sub-band frequency analyzer 220, which partitions the multichannel audio signal into successive frames and decomposes each frame of each channel into a plurality of frequency sub-bands. In various embodiments, the sub-band frequency analyzer 220 includes a Fourier transform process and the output comprises a plurality of frequency bins. The decomposed audio signals are then provided to the target activity detector 225 and the target enhancement engine 230.

The target activity detector 225 is operable to analyze the frames of one or more of the audio channels and generate a signal indicating whether target audio is present in the current frame. As discussed above, target audio may be any audio to be identified by the audio system. When the target audio is human speech, the target activity detector 225 may be implemented as a voice activity detector. In various embodiments, the voice activity detector is operable to receive a frame of audio data and make a determination regarding the presence or absence of the target audio. In some embodiments, the target activity detector 225 may apply target audio classification rules to the sub-band frames to compute a value. The value is then compared to the threshold value for generating a target activity signal. In various embodiments, the signal generated by the target activity detector 225 is a binary signal, such as an output of '1' to indicate a presence of target speech in the sub-band audio frame and the binary output of '0' to indicate an absence of target speech in the sub-band audio frame. The generated binary output is provided to the target enhancement engine 230 for further processing of the multichannel audio signal. In other embodiments, the target activity signal may comprise a probability of target presence, an indication that a determination of target presence cannot be made, or other target presence information in accordance with system requirements.

The target enhancement engine 230 receives the sub-band frames from the sub-band frequency analyzer 220 and the target activity signal from the target activity detector 225. The target enhancement engine 230 processes and enhances the portion of the audio signal determined to be the target audio source and suppress the other portions of the audio signal which are determined to be noise.

After enhancing the target audio signal, the target enhancement engine 230 may pass the processed audio signal to the synthesizer 235. In various embodiments, the synthesizer 235 reconstructs one or more of the multichannel audio signals on a frame-by-frame basis by combing the sub-bands to form an enhanced time-domain audio signal. The enhanced audio signal may then be transformed back to the time domain and sent to a system component or external device for further processing, such as voice command processing.

Figure 3:
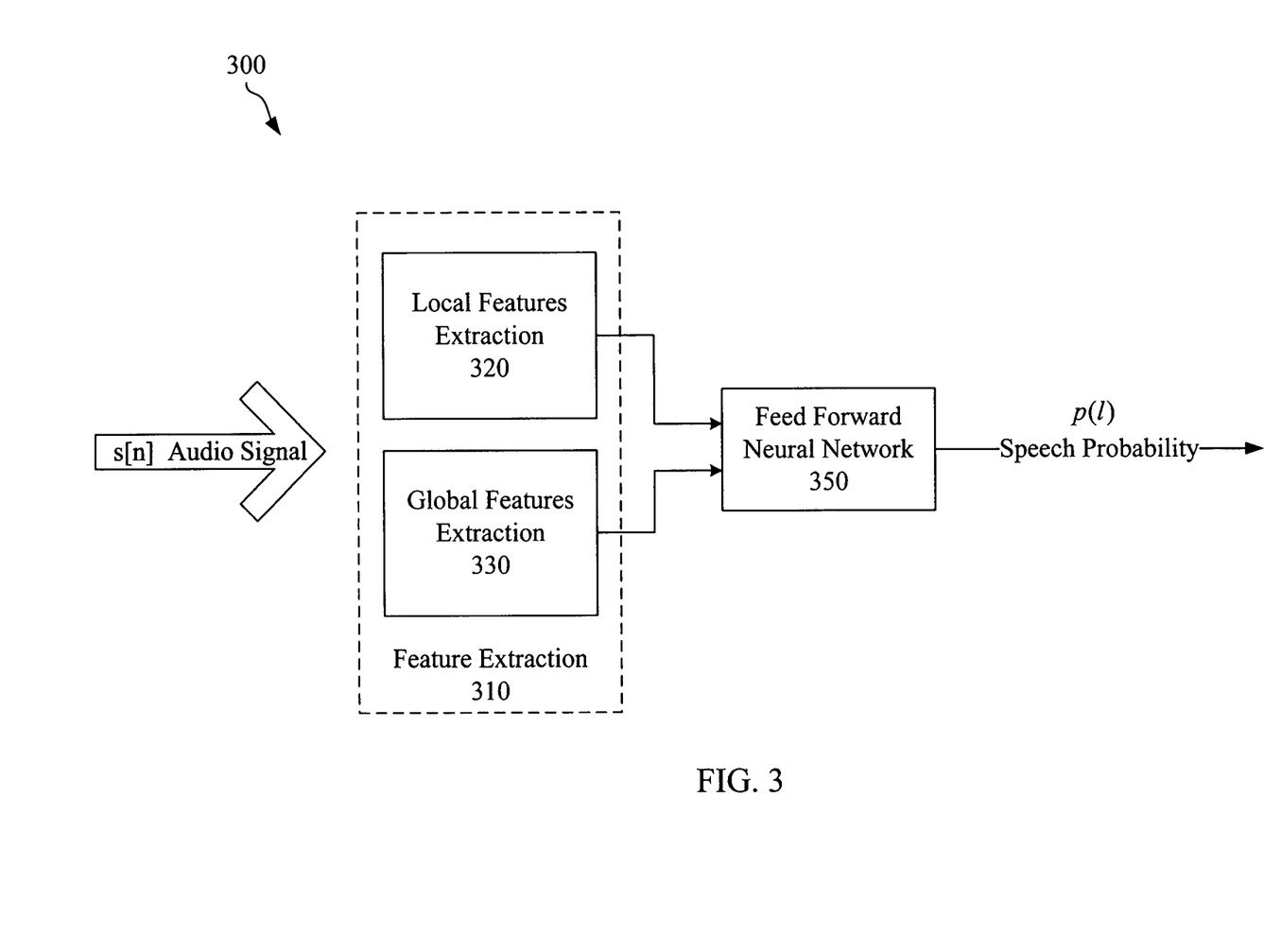
FIG. 3 illustrates an example voice activity detector in accordance with one or more embodiments of the present disclosure.

Referring now to FIG. 3, an embodiment of an operation of a Voice Activity Detector (VAD) is illustrated. The VAD 300 may be part of the target activity detector 225 in FIG. 2 in coordination with other components of audio signal processor 200. For example, the audio signal processor 200 may include the VAD 300, which is operable to receive, process, and analyze an audio signal input and determine a probability that the audio signal input contains human speech. As illustrated, the VAD 300 includes a feature extraction module 310 and a neural network 350. The feature extraction module 310 includes a local features extraction module 320 and a global feature extraction module 330. Each of these components may respectively extract the local and global features at each frame of the input audio signal. The neural network 350 may be a neural network (e.g., a feedforward neural network, recurrent neural network, or convolutional neural network) with one or more hidden layers and one output layer with one neuron. The output of the output layer may include the speech probability for each input frame.

In operation, the input signal s[n] is provided to the feature extraction component 310 in a series of time frames (l). The feature extraction component 310 is operable to compute or determine the local features and global features of the input signal at each time frame. The global and local features are then provided to the neural network 350. The neural network 350 which can be a feedforward network computes the speech probability at each time frame p(l).

Figure 4:
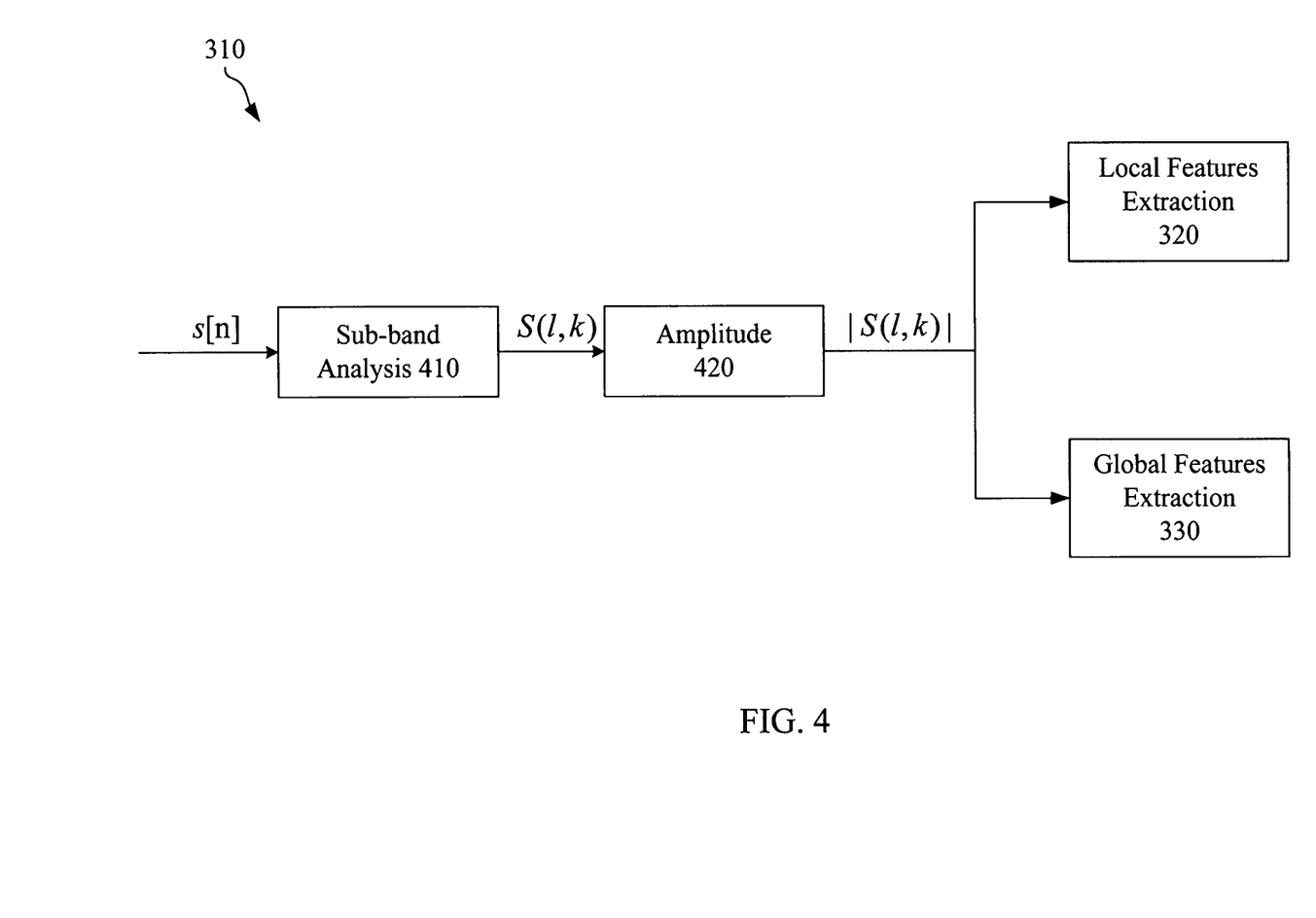
FIG. 4 illustrates example feature extraction components in accordance with one or more embodiments of the present disclosure.

Referring now to FIG. 4, an embodiment of the feature extraction component 310 will be further described. A sub-band analysis component 410 is operable to transform time domain audio signals s[n] into frequency sub-band frames. In various embodiments, the sub-band analysis component 410 may be implemented in the sub-band frequency analyzer 220 of FIG. 2, or in the feature extraction component 310. For example, the audio signals s[n] may be processed into frequency domain audio signals S(l, k) using a sub-band analysis, such as through a Short-Time Fourier Transform (STFT) analysis. An amplitude component 420, may then compute the amplitude (or magnitude) of the sub-bands of the input signal in frequency domain. The results |S(l, k)| may then be used by local features extraction component 320 and global feature extraction component 330, which are further described herein.

Figure 5:
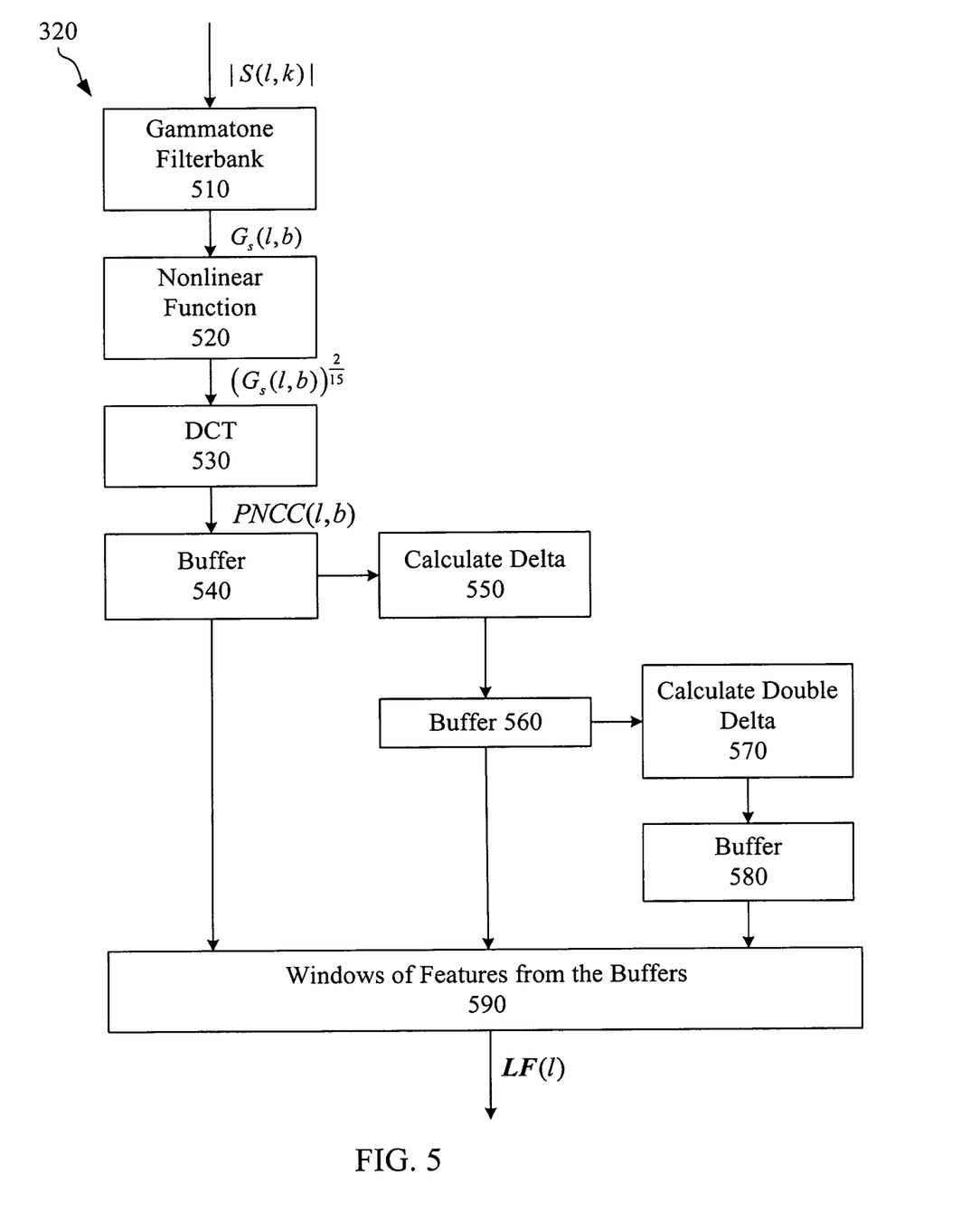
FIG. 5 illustrates example local feature extraction components in accordance with one or more embodiments of the present disclosure.

FIG. 5 illustrates an embodiment of the local features extraction component 320. In some embodiments, the local features may include Power-Normalized Coefficients (PNCC) features which are calculated by the local features extraction component 320. A gammatone filterbank 510 is operable to receive the sub-band amplitude values |S(l, k)| for the current frame and reduce the dimensionality of the input. For example, the amplitude of the audio signal |S(l,k)| may be fed to the gammatone filter bank 510 which is operable to provide a matrix transformation as follows:

$S(l)=[|S(l,1)|,|S(l,2)|,\ldots,|S(l,K)|]^T$ K is the number of frequency bins $G_s(l)=S(l)*\mathbf{Q}$ $G_s(l)=[G_s(l,1),G_s(l,2),\ldots,G_s(l,B)]^T$ B is the number of Gammatone filter $\mathbf{Q}$ is a gammaton filterbank matrix; it is a K*B matrix In some embodiments, the number of gammatone filters may be set to 40. A nonlinear function component 520 applies a nonlinear function and a discrete cosine transform (DCT) component 530 is used to determine the PNCC features as follows:

$$PNCC(l, b) = dct\left(G_s(l, b)^{\frac{2}{15}}\right)$$

A buffer 540 stores the PNCC features.

In one or more embodiments, the output of the DCT function has B=40 coefficients. In some embodiments, the first 13 coefficients, after excluding the first coefficient, are used to obtain the PNCC features at each frame. The first coefficient may be excluded since it is related to the energy of the signal at each frame, however, the proposed VAD system includes a speech detection solution which is level independent. To further enforce this property of the system, the operation may prepare the training speech signal for the neural network to have different random levels. For example, the training speech signal may be randomly scaled with a random number (normally between 0 dB to −25 dB) and this new signal is used for training the network. These techniques may allow the VAD system to be robust to dynamic differences in the input signal.

At delta component 550, delta features are calculated using the PNCC features as its input, as follows:

$$\text{delta}(l, b) = \frac{\sum_{i=1}^{\theta} i(PNCC(l, b) - PNCC(l, b - i))}{2\sum_{i=1}^{\theta} i^2}$$

The delta features are fed to buffer 560. Similarly, at a second delta component 570, double delta features are calculated from the delta features stored in buffer 560. The double delta features may be stored in a buffer 580.

The PNCC features, the delta features, and the double delta features for a plurality of frames are retrieved from the buffers 540, 560 and 580, respectively, and provided to local features calculation components 590, which determine the local features LF(l) using a window of L frames (e.g., an odd number of frames) of the PNCC features, delta features, and double delta features.

Figure 6:
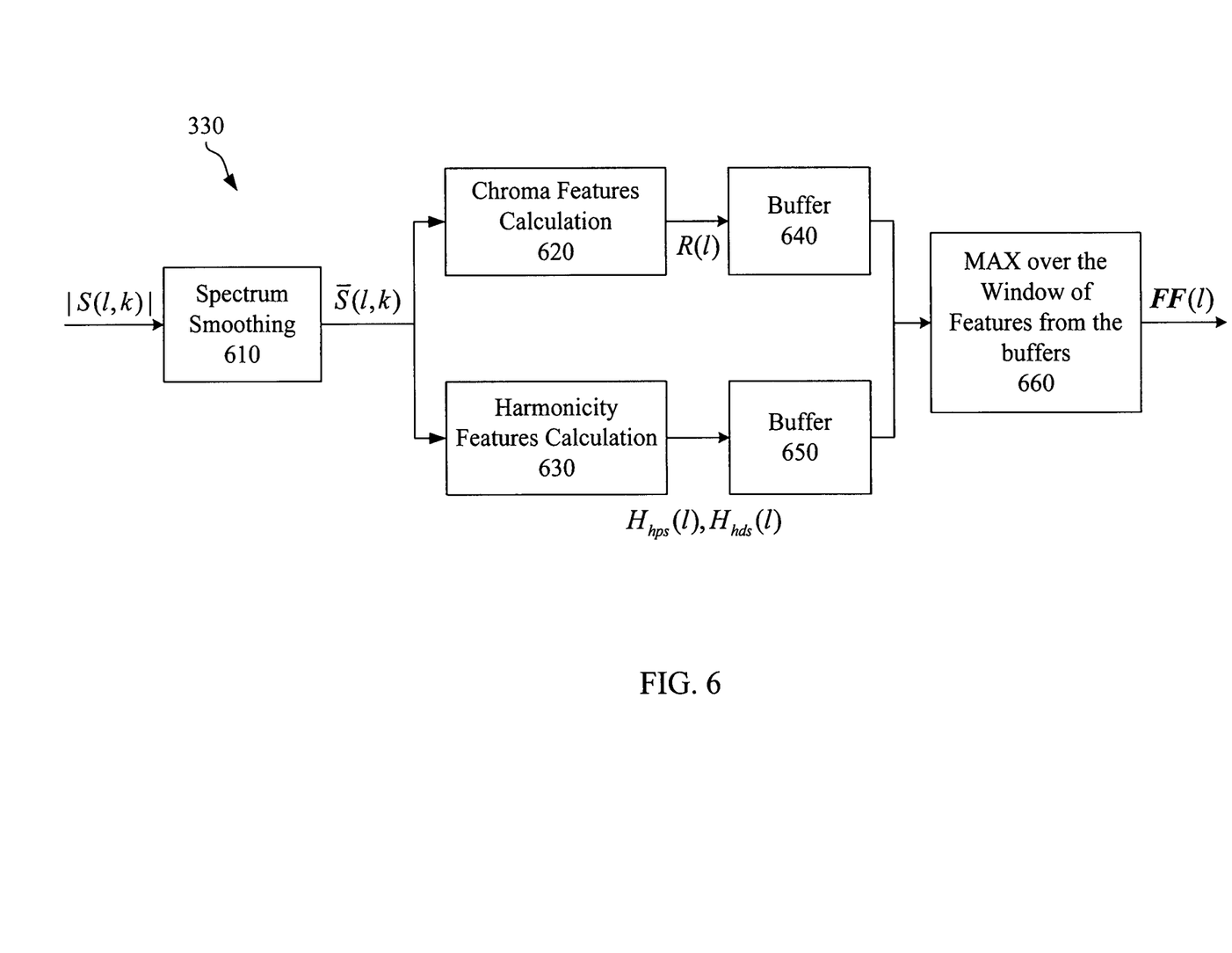
FIG. 6 illustrates example global feature extraction components in accordance with one or more embodiments of the present disclosure.

Referring now to FIG. 6, an example global feature extraction component 330 is illustrated in accordance with one or more embodiments. The amplitude of the audio signal |S(l,k)| is provided to speech spectrum smoothing components 610 to produce a smoothed audio signal which is provided to global features components. The global features may include one-dimensional features and may carry information about the input signal characteristic across the entire frame. In various embodiments, the global features usually have high values in speech content frames and low values in noise content frames. As illustrated, the VAD system utilizes two types of global features, such as the harmonicity-based features and chroma features.

The spectrum smoothing component 610 may obtain a smoothed speech spectrum by estimating recursively using a smoothing factor β as follows (e.g., using a β value that is very close to one):

$\overline{S}(l,k)=\beta\times\overline{S}(l,k)+(1-\beta)\times|S(l,k)|$

Chroma features components 620, determines the chroma features and stores the chroma features in a buffer 640. Harmonicity features components 630 calculate the harmonicity features of the audio signal frame and store the harmonicity features in a buffer 650. Similar to the process for local feature extraction, the buffers may be used to store the values for preceding frames. The MAX components 660 determine a max value over the window of L frames to produce a single global feature for each frame.

Figure 7:
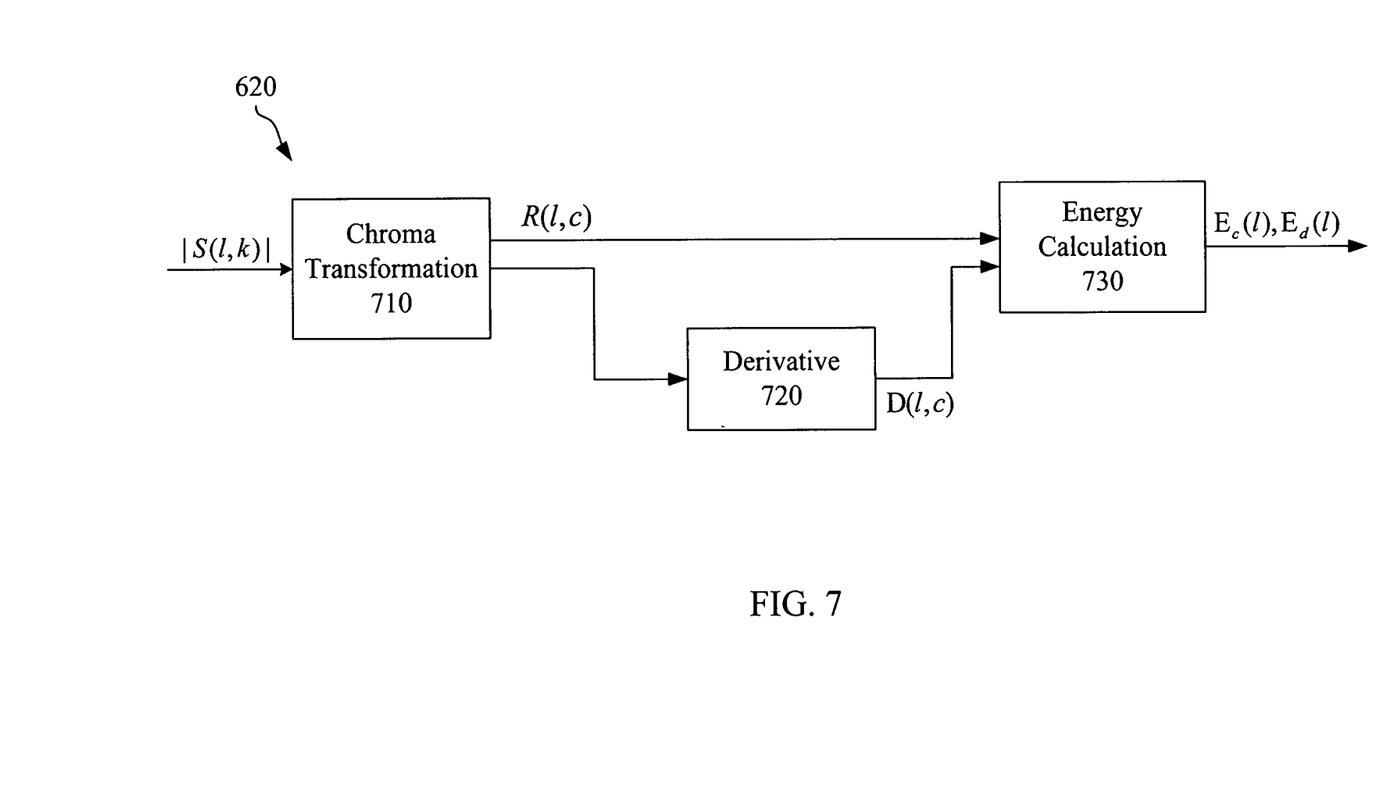
FIG. 7 illustrates example chroma feature calculation components in accordance with one or more embodiments of the present disclosure.

Referring now to FIG. 7, an embodiment of chroma features components 620 is illustrated. Chroma features are related to audio pitches and chords. The human perception of pitch is periodic in the sense that two pitches are perceived as similar if they differ by one or more octaves. As such, a chord in one octave serves the same musical purpose as the same chord in another octave. Chroma utilizes this principle to reduce the speech spectrum by summing exponentially separated frequencies into the same bin, essentially folding octaves of the spectrogram into the same range. Chroma features may provide, for example, a representation for audio for music in which the entire spectrum is projected onto a smaller number bins ($N_c$) representing the distinct chroma of the musical octave.

As shown in FIG. 7, the chroma feature component 620 may obtain the chroma features by a chroma transformation component 710. In the illustrated system, chroma representation may be obtained by multiplying the chroma transformation matrix $W_{c, k}$ with the smoothed speech spectrum as follows:

if $\overline{S}(l)=[\overline{S}(l,1),\ldots,\overline{S}(l,K)]^T R(l)=[R(l,1),\ldots,R(l,N_c)]^T$ $R(l)=W_{c,k}*\overline{S}(l)$ where $N_c$ is the number of chroma bins and R(l) is the chroma vector at frame l.

The aforementioned chroma transformation matrix $W_{c, k}$ may be obtained using the following steps.

Step 1: compute the physical frequency in Hz.

$$F(k) = \frac{k \times f_s}{N_k}$$

$k = 1, 2, \ldots, K$ where $f_s$ is the sample frequency and K is the number of frequency bins after applying the sub-band analysis.

Step 2: the frequency is converted to the octaves by the following equations.

$$O(k) = \log_2\left(\frac{F(k)}{27.5}\right)$$

$$k = 2, 3, \ldots, K$$

$$O(1) = O(2) - \frac{3N_c}{2}$$

Step 3: the chroma transformation matrix $W_{c,k}$ is computed by the following equations:

$$D(c, k) = \text{rem}\left(O(k) - c + \frac{11N_c}{2}, N_c\right) - \frac{N_c}{2}$$

$$c = 1, \ldots, N_c$$

$$\begin{cases} B(k) = O(k+1) - O(k), & \text{if } k = 0, \ldots K-1 \\ B(N_k) = 1 \end{cases}$$

$$R(k) = \exp\left(\frac{-1}{2}\left(\frac{O(k)}{N_c} - 5\right)^2\right)$$

$$W'(c, k) = \exp\left(\frac{-1}{2}\left(\frac{2 \times O(k)}{B(k)}\right)^2\right)$$

$$W(c, k) = \frac{W'(c, k)}{\|W'(c, k)\|_2} \times R(k)$$

where rem(•) is the remainder function after division and $\|\cdot\|_2$ is norm-2.

Derivative component 720 may estimate the derivative of the chroma vector to compute the chroma features. This derivative is estimated as follows:

$$D(l, c) = \begin{cases} R(l, c+1) - R(l, c) & \text{if } 1 \le c < N_c \\ R(l, N_c) - R(l, 1) & \text{if } c = N_c \end{cases}$$

The chroma representation may allow the VAD method/system to discriminate between speech and non-speech signal especially music. Energy component 730 may calculate the energy of the vector. The chroma features $E_c(l)$, $E_d(l)$ may be obtained by calculating the energy of the chroma vector and its derivative at each frame as follows:

$$E_c(l) = \sum_{c=1}^{N_c} (R(l, c))^2$$

$$E_d(l) = \sum_{c=1}^{N_c} (D(l, c))^2$$

Referring back to FIG. 6, the global feature extraction components 330 include a harmonicity feature component 630 operable to determine harmonicity features. In the STFT domain, the harmonics of the pitch frequency are apparent in the magnitude spectrum of speech during voice and speech-like segments. This observation may serve as one of the bases for the harmonic based features. In the illustrated VAD system, two different harmonicity-based features may be used: the Harmonic Additive Spectrum (HAS) technique and the Harmonic Difference Spectrum (HDS) technique.

The HAS feature may be obtained using the power spectrum of the speech signal with the following equations:

$$P(l, k) = |\bar{S}(l, k)|^2$$

$$K_{HAS}^l = \arg\max_k \sum_{m=1}^{M_{HAS}} P(l, mk)$$

$$k = 1, 2, \ldots, K_{max}^{HAS}$$

$$HAS(l) = \max\left\{\sum_{m=1}^{M} P(l, mK_{HAS}^l), 0\right\}$$

whereas $M_{HAS}$ is the number of harmonics that needs to be summed for the HAS feature. In some embodiments, the number of harmonics may be set to 8. $K_{max}^{HAS}$ is the highest frequency bin. In some embodiments, $K_{max}^{HAS}$ is set at 1000 Hz.

The HDS features are based on difference of harmonics of the smoothed speech spectrum. The HDS features may be obtained as follows:

$$U(l, k) = \sum_{i=1}^{M_{HDS}} \bar{S}(l, i \times k)$$

$$k = 1, 2, \ldots, K_{max}^{HDS}$$

$$L(l, k) = \sum_{i=2}^{M_{HDS}} \bar{S}(l, \text{round}((i - 0.5) \times k))$$

$$k = 1, 2, \ldots, K_{max}^{HDS}$$

$$K_{HDS}^l = \arg\max_k (U(l, k) - L(l, k))$$

$$k = 1, 2, \ldots, K_{max}^{UDS}$$

$$HDS(l) = \max\{(U(l, K_{HDS}^l) - L(l, K_{HDS}^l)), 0\}$$

where $M_{HDS}$ is the number of harmonics used for HDS feature. In some embodiments, $M_{HDS}$ is set to 5. $K_{max}^{HDS}$ is the highest frequency bin. In some embodiments, $K_{max}^{HDS}$ is set at 1500 Hz and round (•) is the round function which rounds the number to the nearest integer.

Figure 8:
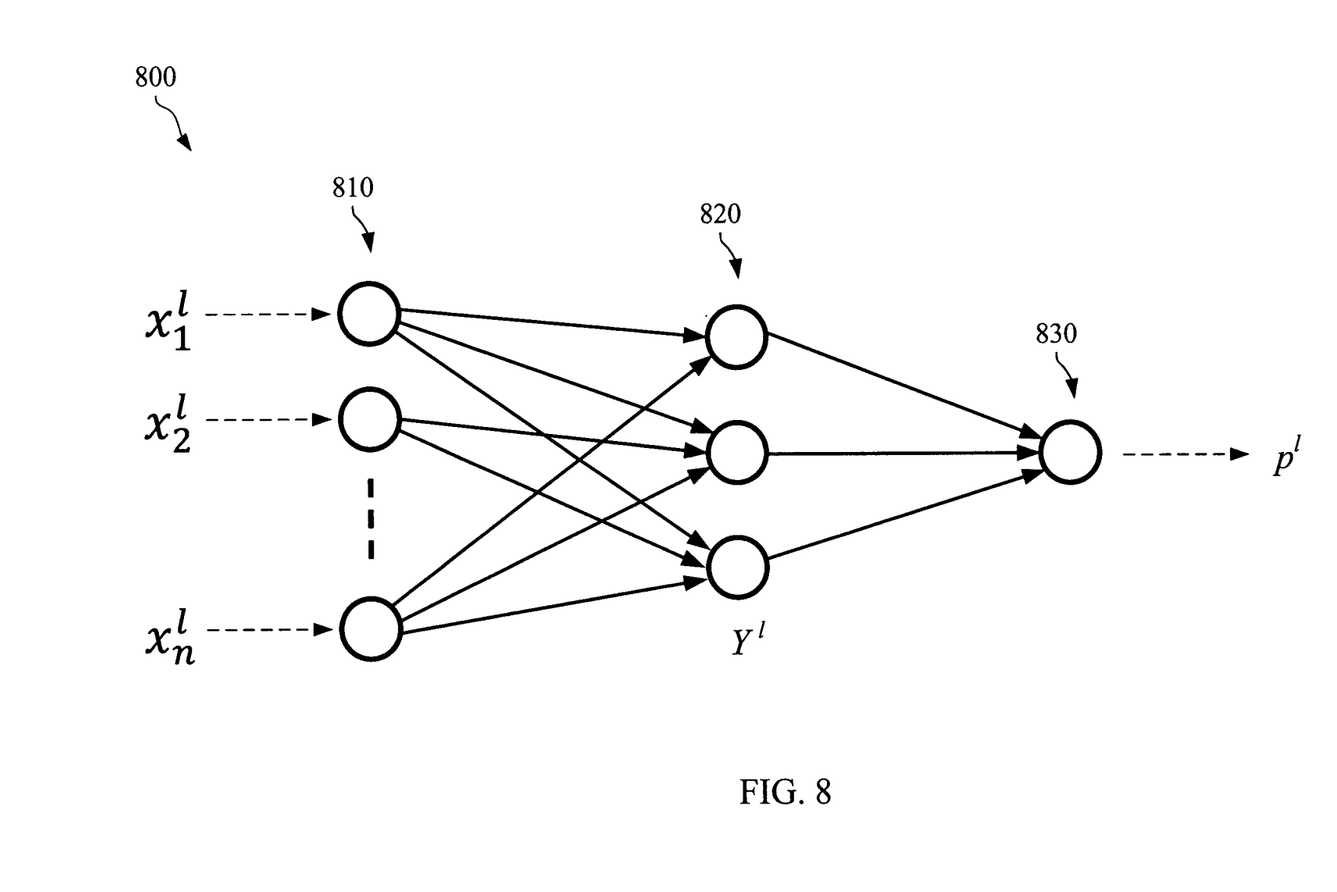
FIG. 8 illustrates an example neural network for detecting target audio in an audio signal in accordance with one or more embodiments of the present disclosure.

Referring to FIG. 8, an example neural network which can be a feedforward network 800 will be discussed that may be used to train the VAD system. In some embodiments, three non-overlapping frames may be used to build the local feature. Input feature 810 at time frame 1 is denoted by $X^l = [x_1^l, \ldots x_{112}^l]^T$. Hidden layer 820 output (first layer) at time frame 1 is $Y^l = [y_1^l, \ldots, y_L^l]^T$. It is assumed that the number of neurons at the hidden layer is L. The Output 830 (speech detection probability) at frame 1 is denoted by $p^l$.

In one or more embodiments, the training procedure includes the following:

1. Forward Pass: The network outputs at the output node $p^l$ for each frame of a sequence of training data are computed.

2. Backward pass: The output of the network $p^l$ and the ground truth $y_l$, are used to compute the output error of the network and then the back-propagation is used to update the weights and biases of the network. The cross entropy is used as an error function for the training, which is defined as:

$$C(p^l, y^l) = -(y^l \times \log(p^l) + (1 - y^l) \times \log(1 - p^l))$$

The forward pass from input layer to the output layer for the network with one hidden layer may include two steps:

Step 1:
Hidden output $Y^l = \tanh(W_{xh}X^l + b_h)$
hidden output at frame l $Y^l$->L*1
input to hidden weight $W_{xh}$->L*112
input layer (pncc feature for a window of three frames and other global features) at frame l $X^l$->112*1
hidden layer biases $b_h$->L*1

$$\tanh(x) = \frac{2}{1+e^{-2x}} - 1$$
$$-1 < \tanh(x) < 1$$

Step 2:

$$z^l = W_{ho}Y^l + b_o$$
$$p^l = \frac{1}{1+e^{-z^l}}$$

hidden output at frame l $Y^l$->L*1
hidden to output weight $W_{ho}$->1*L
output layer biases $b_o$->1*1

Figure 9:
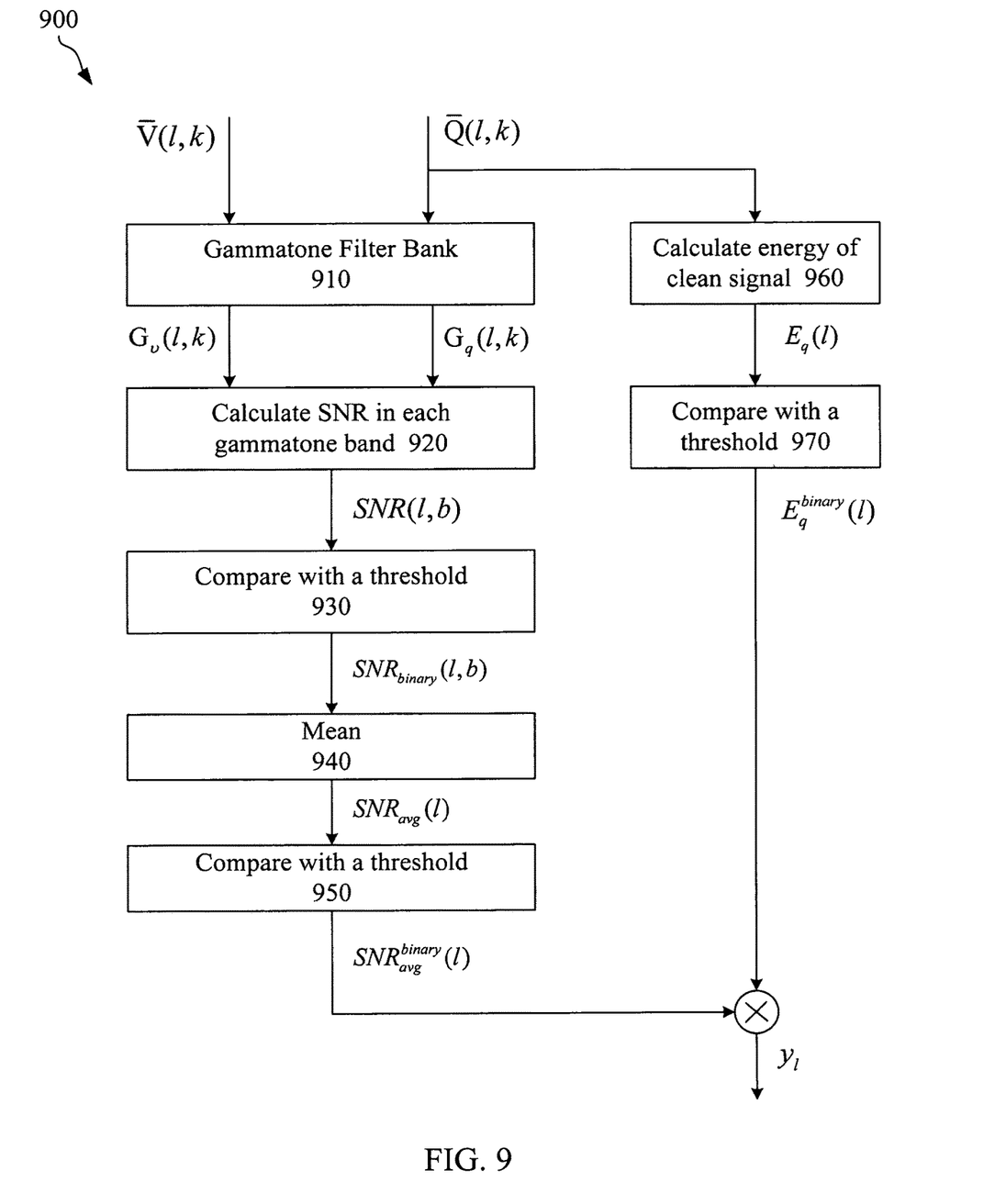
FIG. 9 illustrates example neural network components in accordance with one or more embodiments of the present disclosure.

For the backward pass, the cost function for the proposed system is the cross-entropy defined as follows:

$$C(p^l, y^l) = -(y^l \times \log(p^l) + (1-y^l) \times \log(1-p^l))$$

where $y^l$ is the ground-truth target value at frame l. A process for determining the ground-truth target value $y^l$ is discussed later with respect to FIG. 9.

To train the network which includes updating its weights and biases, the process may compute the output error ($\delta^l$) received at the node of the output layer (i.e. $z^l$). Then, the process may propagate the output error backwards. Hence, the process may calculate the cost function derivative as:

$$\frac{dC(p^l, y^l)}{dz^l} = -\delta^l = \frac{dC(p^l, y^l)}{dp^l} \times \frac{dp^l}{dz^l}$$
$$\frac{dp^l}{dz^l} = p^l(1-p^l)$$

The output error can be obtained as follows:

$$\delta^l = y^l - p^l$$

Referring now to FIG. 9, which illustrates a flowchart for determining the ground-truth target value. The noisy training speech signal s[n] is obtained by adding the clean speech signal q[n] and the noise signal υ[n] as:

$$s[n] = q[n] + υ[n]$$

By using the sub-band analysis, the noisy signal in frequency domain S(l,k) is modeled as:

$$S(l,k) = Q(l,k) + V(l,k)$$

where V(l,k) and Q(l,k) are the noise and clean signals in frequency domain, respectively.

FIG. 9 illustrates components for estimating the ground-truth target for training the noisy speech signal (s[n]) at each frame. In some embodiments, the ground-truth target may be determined based on Signal to Noise Ratio (SNR) for all the frequency bins after applying the gammatone filterbank 910, to the amplitude of the spectrum for clean, noise and noisy speech signals. Thus, the amplitude spectrum of the signals in frequency are computed and they are denoted by $\overline{S}(l,k)$, $\overline{Q}(l,k)$ and $\overline{V}(l,k)$ for noisy speech, clean speech and noise signals, respectively.

The gammatone filterbank 910 output for clean, and noise and speech signals are obtained and they are denoted by $G_q(l,b)$, and $G_v(l,b)$ respectively. SNR component 920 calculates the SNR for each band of gammatone outputs which is calculated as follows:

$$SNR(l,b) = \frac{(G_q(l,b))^2}{(G_q(l,b))^2 + (G_v(l,b))^2}$$

Threshold comparator 930 compares the SNR with a threshold $\tau_{snr}$ to produce a binary result. This can be written as follows:

$$SNR_{binary}(l,b) = \begin{cases} 1 & SNR(l,b) > \tau_{snr} \\ 0 & SNR(l,b) \leq \tau_{snr} \end{cases}$$

Mean components 940 compute the mean of the binary SNR as $$SNR_{avg}(l) = \frac{1}{B}\sum_{b=1}^{B} SNR_{binary}(l,b)$$

Threshold comparator 950 compares the mean value of the binary SNR with a threshold $\tau_{avg}$ and this can be written as follows:

$$SNR_{avg}^{binary}(l) = \begin{cases} 1 & SNR_{avg}(l) > \tau_{avg} \\ 0 & SNR_{avg}(l) \leq \tau_{avg} \end{cases}$$

As it is shown in FIG. 9, the energy of the clean speech signal may be calculated by energy components 960, and be used to compute a binary speech detector based on the energy. This speech detector has a binary value and is denoted by $E_q^{binary}(l)$ which may be computed, by threshold comparator 970, as given below:

$$E_q(l) = \sum_{k=1}^{K} \overline{Q}(l,k)$$
$$E_q^{binary}(l) = \begin{cases} 1 & E_q(l) > \tau_{energy} \\ 0 & E_q(l) \leq \tau_{energy} \end{cases}$$

where $\tau_{energy}$ is a threshold for the energy of the speech signal at each frame.

The ground truth target ($y_l$) at frame l, as shown in FIG. 9, may then be computed as $$y_l = SNR_{avg}^{binary}(l) \times E_q^{binary}(l)$$

The ground truth target value may be used to train the neural network.

According to one or more of the aforementioned VAD systems and methods, a noisy speech stream may be classified into speech and non-speech (i.e. noise only) segments. As such, VAD is used in various many speech communication systems, such as speech recognition, noise reduction, sound source localization, and etc. In an example, VAD may be used for speech enhancement. Speed enhancement algorithms, as incorporated in hands-free telephony or hearing aids, may rely on noise characteristics that are estimated in time intervals where speech is absent. Robust detection of speech may be implemented to exclude speech components from the noise estimates and to reduce artifacts caused by aggressive noise reduction during speech. Latencies may be kept as small as possible to ensure simultaneousness between input and output signals. Also, the VAD may rely on short window with no memory to be able to detect speech in far-field where the level of speech is not dominant and there may be some impulsive noises. Additionally, the hardware's capabilities may be limited, so the memory and CPU consumptions may be scaled accordingly.

In another example, VAD may be used in speech transmission. Speech transmission, e.g., via mobile networks, may primarily focus on speech segments. VAD may be implemented to detect speech pauses during which the signal is not transmitted, so as to improve system efficiency.

In yet another example, VAD may be used in Automatic Speech Recognition (ASR) systems. In one hand, these systems are typically controlled by VAD which may detect the beginning and the end of speech utterances. Thus, recognition can be performed only on intervals where there is speech in the utterance. On another hand, speech detection may improve the speech enhancement method which is essential for ASR systems for robust speech recognition in high noisy condition. When a small recognition delay is acceptable, the latency requirements may be relaxed to allow the speech detector to employ more temporal context information.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The invention claimed is:

1. An audio processing device comprising:
   an audio sensor operable to receive audio input and generate an audio signal based on the audio input; and
   an audio signal processor comprising:
      a local feature extraction component operable to extract local features from the audio signal;
      a global feature extraction component operable to extract global features from the audio signal, wherein the global feature extraction component comprises a spectrum smoothing component operable to generate a smoothed spectrum of the audio signal, a chroma feature component operable to determine chroma features based on the smoothed spectrum, and a harmonicity feature component operable to determine harmonicity features based on the smoothed spectrum; and
      a neural network operable to determine a probability that a target audio is present in the audio signal based on the local and global features;
      wherein the chroma feature component comprises a chroma transformation matrix operable to perform a chroma transformation, a derivative component operable to estimate a derivative of chroma vector, and an energy component operable to determine an energy of the chroma vector; and
      wherein the harmonicity feature component is operable to determine Harmonic Additive Spectrum (HAS) features and Harmonic Difference Spectrum (HDS) features.

2. The audio processing device of claim 1, wherein the target audio is associated with a person's voice.

3. The audio processing device of claim 1, wherein the audio signal processor further comprises:
   a sub-band analysis component operable to transform the audio signal in sub-bands in frequency domain; and
   a magnitude determining component operable to determine magnitudes of the sub-bands in frequency domain.

4. The audio processing device of claim 1, wherein the local feature extraction component comprises:
   a Gammatone filter bank operable to determine Power-Normalized Coefficients (PNCC) of the audio signal, and
   a delta component operable to determine delta features and double delta features from the PNCC.

5. The audio processing device of claim 4, wherein the local feature extraction component is operable to store the PNCC, the delta features, and the double delta features as the local features of the audio signal.

6. The audio processing device of claim 1, wherein the neural network is operable to output a binary value indicating whether the target audio is present in the audio signal.

7. A method for processing audio signals, comprising:
   receiving audio input and generating an audio signal based on the audio input by an audio transducer;
   extracting local features from the audio signal;
   extracting global features from the audio signal by generating a smoothed spectrum of the audio signal, determining chroma features based on the smoothed spectrum, and determining harmonicity features based on the smoothed spectrum; and
   determining, by a neural network, a probability that a target audio is present in the audio signal based on the local and global features
   wherein the determining chroma features comprises performing a chroma transformation by chroma transformation matrix, estimating a derivative of chroma vector; and determining an energy of the chroma vector; and wherein the determining harmonicity features comprises determining Harmonic Additive Spectrum (HAS) features and Harmonic Difference Spectrum (HDS) features.

8. The method of claim 7, wherein the target audio is associated with a person's voice.

9. The method of claim 7, further comprising:
transforming the audio signal in sub-bands in frequency domain; and
determining magnitudes of the sub-bands in frequency domain.

10. The method of claim 7, wherein the extracting local features comprises:
determining Power-Normalized Coefficients (PNCC) of the audio signal using a Gammatone filter bank, and
determining delta features and double delta features from the PNCC.

11. The method of claim 10, wherein the extracting local features comprises storing the PNCC, the delta features, and the double delta features as the local features of the audio signal.

12. The method of claim 7, further comprising determining by the neural network, a binary value indicating whether the target audio is present in the audio signal.

13. The method of claim 7, further comprising training the neural network by updating weights and biases of the neural network based on an output error of a forward pass.

14. The method of claim 7, further comprising estimating a ground-truth garget value for training the neural network.

* * * * *